(12) United States Patent
Xu et al.

(10) Patent No.: US 9,602,250 B2
(45) Date of Patent: Mar. 21, 2017

(54) METHOD FOR RETRANSMITTING DATA IN WIRELESS COMMUNICATION SYSTEM

(75) Inventors: Jian Xu, Anyang-si (KR); Young Soo Yuk, Anyang-si (KR); Dong Guk Lim, Anyang-si (KR); Han Gyu Cho, Anyang-si (KR); Yong Ho Kim, Anyang-si (KR); Jin Sam Kwak, Anyang-si (KR)

(73) Assignee: LG Electronics Inc., Seoul (KR)

( * ) Notice: Subject to any disclaimer, the term of this patent is extended or adjusted under 35 U.S.C. 154(b) by 1056 days.

(21) Appl. No.: 13/388,639

(22) PCT Filed: Feb. 22, 2010

(86) PCT No.: PCT/KR2010/001073
§ 371 (c)(1),
(2), (4) Date: Feb. 2, 2012

(87) PCT Pub. No.: WO2011/021759
PCT Pub. Date: Feb. 24, 2011

(65) Prior Publication Data
US 2012/0127897 A1    May 24, 2012

Related U.S. Application Data

(60) Provisional application No. 61/234,981, filed on Aug. 18, 2009.

(51) Int. Cl.
*H04B 7/14*    (2006.01)
*H04L 1/18*    (2006.01)

(52) U.S. Cl.
CPC .......... *H04L 1/1812* (2013.01); *H04L 1/1887* (2013.01)

(58) Field of Classification Search
CPC .. H04W 4/00; H04W 4/10; H04B 7/14; H04J 3/00; H04J 1/00
(Continued)

(56) References Cited

U.S. PATENT DOCUMENTS

2008/0107073 A1    5/2008 Hart et al.
2008/0227461 A1    9/2008 Dayal et al.
(Continued)

FOREIGN PATENT DOCUMENTS

| KR | 10-0636923 B1 | 10/2006 |
|---|---|---|
| KR | 10-2009-0017398 A | 2/2009 |
| WO | 10-2001-0031752 A | 4/2001 |

OTHER PUBLICATIONS

"IEEE C802.16j-08/150", "FDD and H-FDD frame structure for IEEE 802.16j Multihop Relay Networks", dated "Sep. 15, 2008", and published under <http://ieee802.org/16>.*

*Primary Examiner* — Gregory Sefcheck
*Assistant Examiner* — Majid Esmaeilian
(74) *Attorney, Agent, or Firm* — Dentons US LLP

(57) ABSTRACT

A method for retransmitting data in wireless communication system is disclosed. MS can receive a NACK (Not-Acknowledge) signal from a base station (BS) through a specific downlink subframe of a specific frame in a first superframe, and the MS can retransmits the data using a second uplink subframe in a first frame in a second superframe subsequent to a first superframe. In this case, a index of the second uplink subframe may be 1. The wireless communication system can support the Half-Frequency Division Duplex (H-FDD) scheme. A first uplink subframe in the first frame of the second superframe can be punctured.

3 Claims, 6 Drawing Sheets

(58) Field of Classification Search
USPC .................................. 370/279, 328, 281, 315
See application file for complete search history.

(56) References Cited

U.S. PATENT DOCUMENTS

| | | | |
|---|---|---|---|
| 2009/0042616 A1* | 2/2009 | Teo ........................ | H04B 7/061 |
| | | | 455/562.1 |
| 2009/0185632 A1* | 7/2009 | Cai et al. ...................... | 375/260 |
| 2009/0265599 A1* | 10/2009 | Chae et al. ................... | 714/749 |
| 2010/0008283 A1* | 1/2010 | Chitrapu et al. ............. | 370/312 |
| 2011/0243008 A1* | 10/2011 | Kim ..................... | H04L 1/1893 |
| | | | 370/252 |
| 2012/0269180 A1* | 10/2012 | Li ........................ | H04L 1/1822 |
| | | | 370/336 |

\* cited by examiner

METHOD FOR RETRANSMITTING DATA IN WIRELESS COMMUNICATION SYSTEM

This application is a 35 U.S.C. §371 National Stage entry of International Application No. PCT/KR2010/001073, filed on Feb. 22, 2010, and claims the benefit to and of U.S. Provisional Application No. 61/234,981 filed on Aug. 18, 2009, both of which are incorporated by reference in their entirety herein.

TECHNICAL FIELD

The present invention relates to wireless communications, and in particular, to retransmitting data in specific HARQ timing.

BACKGROUND ART

Institute of Electrical and Electronics Engineers (IEEE) 802.16m system supports TDD and FDD duplex modes, including Half-Frequency Division Duplex (H-FDD) MS operation, in accordance with the IEEE 802.16m system requirements document. Unless otherwise specified, the frame structure attributes and baseband processing are common for all duplex modes.

IEEE 802.16m system uses Orthogonal Frequency Division Multiple Access (OFDMA) as the multiple access scheme in the downlink and uplink. The OFDMA parameters for the IEEE 802.16m are specified as follows table 1.

The IEEE 802.16m basic frame structure is illustrated in FIG. 1. Each 20 ms superframe is divided into four equally-sized 5 ms radio frames, data is transmitted to MS in superframe unit. When using the same OFDMA parameters as in Table 1 with the channel bandwidth of 5 MHz, 10 MHz, or 20 MHz, each 5 ms radio frame further consists of eight subframes. A subframe is assigned for either downlink (DL) or uplink (UL) transmission. There are three types of subframes: 1) the type-1 subframe which consists of six OFDMA symbols, 2) the type-2 subframe that consists of seven OFDMA symbols, and 3) the type-3 subframe which consists of five OFDMA symbols. Each 5 ms radio frame further consists of eight AAI subframes for $G=⅛$ and $1/16$. With the channel bandwidth of 8.75 and 7 MHz, each 5 ms radio frame further consists of seven and six AAI subframes, respectively for $G=⅛$ and $1/16$. In the case of $G=¼$, the number of AAI subframes per frame is one less than that of other Cyclic prefix (CP) lengths for each bandwidth case. Each subframe is consist of 5 to 8 symbols. A AAI subframe shall be assigned for either DL or UL transmission.

As above described, the basic frame structure is applied to FDD and TDD duplexing schemes, including H-FDD MS operation. The number of switching points in each radio frame in TDD systems is two, where a switching point is defined as a change of directionality, i.e., from DL to UL or from UL to DL.

TABLE 1

| Nominal Channel Bandwidth (MHz) | | | 5 | 7 | 8.75 | 10 | 20 |
|---|---|---|---|---|---|---|---|
| Over-sampling Factor | | | 28/25 | 8/7 | 8/7 | 28/25 | 28/25 |
| Sampling Frequency (MHz) | | | 5.6 | 8 | 10 | 11.2 | 22.4 |
| FFT Size | | | 512 | 1024 | 1024 | 1024 | 2048 |
| Sub-Carrier Spacing (kHz) | | | 10.937500 | 7.812500 | 9.765625 | 10.937500 | 10.937500 |
| Useful Symbol Time $T_u$ (μs) | | | 91.429 | 128 | 102.4 | 91.429 | 91.429 |
| Cyclic Prefix $(CP)T_g = ⅛ T_u$ | Symbol Time $T_s$ (μs) | | 102.857 | 144 | 115.2 | 102.857 | 102.857 |
| | FDD | Number of OFDM symbols per Frame | 48 | 34 | 43 | 48 | 48 |
| | | Idle time (μs) | 62.857 | 104 | 46.40 | 62.857 | 62.857 |
| | TDD | Number of OFDM symbols per Frame | 47 | 33 | 42 | 47 | 47 |
| | | TTG + RTG (μs) | 165.714 | 248 | 161.6 | 165.714 | 165.714 |
| Cyclic Prefix $(CP)T_g = 1/16 T_u$ | Symbol Time $T_s$ (μs) | | 97.143 | 136 | 108.8 | 97.143 | 97.143 |
| | FDD | Number of OFDM symbols per Frame | 51 | 36 | 45 | 51 | 51 |
| | | Idle time (μs) | 45.71 | 104 | 104 | 45.71 | 45.71 |
| | TDD | Number of OFDM symbols per Frame | 50 | 35 | 44 | 50 | 50 |
| | | TTG + RTG (μs) | 142.853 | 240 | 212.8 | 142.853 | 142.853 |
| Cyclic Prefix $(CP)T_g = ¼ T_u$ | Symbol Time $T_s$ (μs) | | 114.286 | [TBD] | [TBD] | 114.286 | 114.286 |
| | FDD | Number of OFDM symbols per Frame | 43 | [TBD] | [TBD] | 43 | 43 |
| | | Idle time (μs) | 85.694 | [TBD] | [TBD] | 85.694 | 85.694 |
| | TDD | Number of OFDM symbols per Frame | 42 | [TBD] | [TBD] | 42 | 42 |
| | | TTG + RTG (μs) | 199.98 | [TBD] | [TBD] | 199.98 | 199.98 |

When H-FDD MSs are included in an FDD system, the frame structure from the point of view of the H-FDD mobile station is similar to the TDD frame structure. However, the DL and UL transmissions occur in two separate frequency bands. The transmission gaps between DL and UL (and vice versa) are required to allow switching the Tx and Rx circuitry.

As shown in FIG. 1, a superframe header consists of four subframes. Data is transmitted to MS in superframe unit. H-FDD frame structure succeeds to existing superframe structure, MS need to receive SFH and Advanced-preamble (A-preamble) signal from BS. SFH is located at a first subframe of first frame in a superframe, A-preamble is located at a first subframe of second, third, and fourth frame in the superframe. More specifically, primary A-preamble is located at a first subframe of second, secondary A-preamble is located at a first subframe of third and fourth frame. Superframe header (SFH) is transmitted to MS in superframe unit (every 20 ms). A-Preamble is transmitted to MS in frame (every 5 ms). All the AAI H-FDD MSs should receive the SFH and A-Preamble.

Downlink HARQ and uplink HARQ timing problem is caused by applying existing H-FDD frame structure. That is, the number of UL subframes or DL subframes is varied when two and more superframes are considered. But, H-FDD based frame structure solution for the DL, UL HARQ timing problem is not proposed. Also, the relay frame structure for DL, UL HARQ timing is not proposed yet.

DISCLOSURE OF INVENTION

Technical Problem

An object of the present invention devised to solve the problem lies in providing a data retransmission method.

Solution to Problem

Accordingly, the present invention is directed to a method for retransmitting data in wireless communication system.

In one embodiment of the present invention, a method for retransmitting data in wireless communication system includes receiving a NACK (Not-Acknowledge) signal, at a mobile station (MS), from a base station (BS) through a specific downlink subframe of a specific frame in a first superframe; and retransmitting the data, at the MS, using a second uplink subframe having an subframe index 1 in a first frame of a second superframe subsequent to the first superframe.

In another embodiment of the present invention, a mobile station (MS) apparatus for retransmitting data in wireless communication system includes receiving module for receiving a NACK (Not-Acknowledge) signal from a base station (BS) through a specific downlink subframe of a specific frame in a first superframe; and transmit module for retransmitting the data using a second uplink subframe having an subframe index 1 of a first frame in a second superframe subsequent to the first superframe.

In another embodiment of the present invention, a method for receiving a signal at an odd-hop relay station (RS) using the non-transparent relay frame structure in wireless communication system includes receiving the signal through a uplink receive zone from a even-hop RS corresponding to a subordinate RS of the odd-hop relay station or a mobile station (MS), wherein the uplink receive zone consist of 2 uplink subframes, the signal is received through a first uplink subframe among the 2 uplink subframes, a second uplink subframe subsequent to the first uplink subframe is punctured.

These and other embodiments will also become readily apparent to those skilled in the art from the following detailed description of the embodiments having reference to the attached figures, the present disclosure not being limited to any particular embodiment disclosed.

Advantageous Effects of Invention

According to a one embodiment of the present invention, MS and BS can efficiently retransmit data in specific HARQ timing.

Effects obtainable from the present invention are non-limited by the above mentioned effect. And, it is apparent to those skilled in the art that other unmentioned effects should be clearly understandable from the following description.

BRIEF DESCRIPTION OF DRAWINGS

The above and other aspects and features of the present disclosure will become more apparent upon consideration of the following description of embodiments, taken in conjunction with the accompanying drawing figures.

BEST MODE FOR CARRYING OUT THE INVENTION

Figure 1:
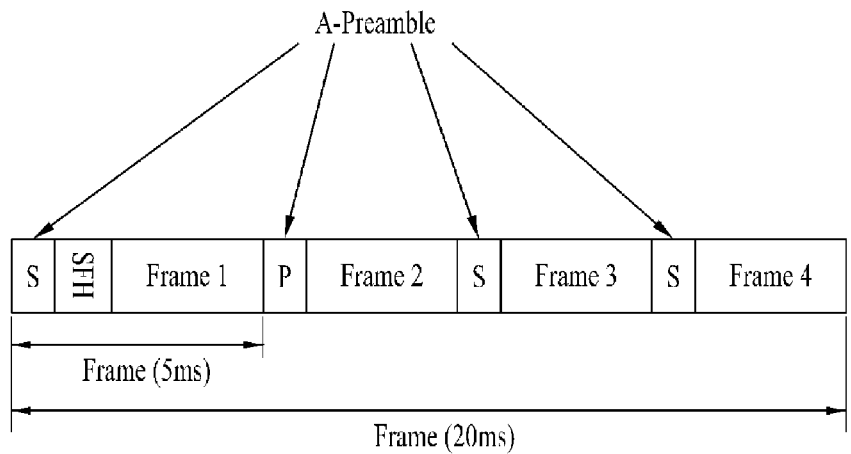
FIG. 1 illustrates the IEEE 802.16m basic frame structure.

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Various embodiments will be presented herein in the context of a wireless communication network and associated entities configured in accordance with the IEEE 802.16 standards family commonly referred to as WiMAX. However, alternatives to such implementations are envisioned and teachings with regard to the WiMAX standard are generally applicable to other standards and air interfaces as well. Moreover, the use of certain terms to describe various embodiments should not limit such embodiments to a certain type of wireless communication system, such as WiMAX. Various embodiments are also applicable to other wireless communication systems using different air interfaces and/or physical layers including, for example, frequency division multiple access (FDMA), time division multiple access (TDMA), code division multiple access (CDMA), wideband CDMA (W-CDMA), and universal mobile telecommunications system (UMTS), the long term evolution (LTE) of the UMTS, and the global system for mobile communications (GSM). By way of non-limiting example only, further description will relate to a WiMAX communication system, but such teachings apply equally to other system types.

In some instances, known structures and devices are omitted, or are shown in block diagram form focusing on important features of the structures and devices, so as not to obscure the concept of the present invention.

In the following description, 'mobile station (MS)' is assumed to refer to a mobile or fixed user end device such as, a user equipment (UE), 'Advanced MS (AMS)' and 'handset' and 'base station (BS)' is assumed to refer to any node of a network end, such as a node B, Advanced Base Station (ABS) and an eNode B, AP (Access Point) communicating with the MS.

In a mobile communication system, an MS may receive information from a BS through a downlink and the MS may transmit information to the BS through an uplink. Information transmitted or received by the MS includes data and control information. There are various physical channels according to types and purposes of information transmitted or received by the MS.

In the following detailed description, the Hybrid Automatic Repeat reQuest (HARQ) scheme for H-FDD based frame structure in Advanced Air Interface (AAI) system in accordance with various embodiments of the present invention will be described. The above mentioned AAI system is an exemplary, here, the kind and definition of the system is not limited. The frame structure supporting for H-FDD MS in the AAI system can be configured based IEEE 802.16m FDD frame structure. A legacy system refers to a system conforming to a conventional specification and corresponds to a conventional system. For example, an IEEE 802.16e system corresponds to a legacy system. However, the legacy system is not limited only to the IEEE 802.16e system.

In the present invention, H-FDD (Half-Frequency Division Duplex) MS means MS using H-FDD scheme, F-FDD (Full-Frequency Division Duplex) MS means MS using F-FDD scheme. The UL HARQ timing means timing of uplink retransmission. The DL HARQ timing means timing of downlink retransmission.

Upon receiving a DL Basic Assignment A-MAP IE, MS attempts to receive and decode the data burst as allocated to it by the DL Basic Assignment A-MAP IE. If the decoding is successful, MS shall send a positive acknowledgement to BS, otherwise, MS can send a negative acknowledgement to ABS.

Upon receiving a UL Basic Assignment A-MAP IE, MS may transmit the subpacket of HARQ data burst through the resource assigned by the UL Basic Assignment A-MAP IE. BS can attempt to decode the data burst. If the decoding is successful, BS can send a positive acknowledgement to MS, otherwise, BS may send a negative acknowledgement to MS. Upon receiving the negative acknowledgement, MS shall trigger retransmission procedure.

In the retransmission procedure, if MS does not receive a UL Basic Assignment A-MAP IE for the HARQ data burst in failure, MS can transmit the next subpacket through the resources in the next frame at the same subframe resource location assigned to the previous subpacket transmission with the same ACID. A UL Basic Assignment A-MAP IE may be sent to signal control information for retransmission with the corresponding ACID and AI_SN being not toggled. Upon receiving the UL Basic Assignment A-MAP IE, MS can perform the HARQ retransmission as instructed in this UL Basic Assignment A-MAP IE.

IEEE 802.16m system can support Full-FDD (F-FDD) MS and Half-FDD (H-FDD) MS. Frame structure supporting for H-FDD MS uses the F-FDD frame structure which is previously defined for existing F-FDD MS. Since F-FDD frame structure consists of subframe unit, frame structure supporting for H-FDD MS can also consist of subframe unit. Also, frame structure supporting for H-FDD scheme uses the existing H-FDD frame structure.

In DL HARQ transmission, DL Basic Assignment A-MAP IE, the HARQ subpacket, and the corresponding feedback can follow the timing defined in Table 2.

TABLE 2

[Table]

| Content | Subframe Index | Frame Index |
|---|---|---|
| Basic Assignment A-MAP IE Tx in DL | 1 | i |
| HARQ subpacket Tx in DL | m = 1 | i |
| HARQ feedback in UL | n = ceil(m + F/2) mod F | $j = \left(i + \text{floor}\left(\frac{\text{ceil}(m+F/2)}{F}\right) + z\right) \mod 4$ |

Referring to table 2, DL HARQ subpacket transmission corresponding to a DL Basic Assignment A-MAP IE in l-th DL subframe of the i-th frame can begin in the m-th DL subframe of the i-th frame. A HARQ feedback for the DL HARQ subpacket shall be transmitted in the n-th UL subframe of the j-th frame. The subframe index m, n and frame index j can be determined by using l and i, as shown in Table 2. In this case, the subframe index l can range from 0 to F−1.

DL HARQ feedback offset z can be set to 1 only if a time gap from completion of the HARQ subpacket transmission to its feedback time derived with z=0 is shorter than the data burst processing time. Otherwise, z can be set to 0. This rule can be also applied to the long TTI transmission.

$$z = \begin{cases} 0, & \text{if}((\text{ceil}(F/2) - N_{TTI}) \geq T_{proc}) \\ 1, & \text{else} \end{cases}$$

where $N_{TTI}$ is the number of subframes which a HARQ subpacket spans; i.e. 1 for the default TTI and 4 for the long TTI in FDD. The index m in Table 2 indicates the 1st subframe which a long TTI subpacket spans.

In UL HARQ subpacket transmission, UL Basic Assignment A-MAP IE, HARQ subpacket, corresponding feedback, and retransmission of the HARQ subpacket shall follow the timing defined in Table 3.

TABLE 3

| Content | Subframe Index | Frame Index |
|---|---|---|
| Basic Assignment A-MAP Tx IE in DL | l | i |
| HARQ Subpacket Tx in UL | m = n where n = ceil(l + F/2)modF | $j = \left(i + \text{floor}\left(\frac{\text{ceil}(l+F/2)}{F}\right) + v\right) \mod 4$ |

TABLE 3-continued

| Content | Subframe Index | Frame Index |
|---|---|---|
| HARQ feedback in DL | l | $k = \left(j + \text{floor}\left(\frac{(1+F/2)}{F}\right) + w\right) \bmod 4$ |
| HARQ Subpacket ReTx in UL | m | $p = \left(k + \text{floor}\left(\frac{\text{ceil}(1+F/2)}{F}\right) + v\right) \bmod 4$ |

UL HARQ subpacket transmission corresponding to a UL Basic Assignment A-MAP IE in l-th DL subframe of the i-th frame can be began in the m-th UL subframe of the j-th frame. A HARQ feedback for the UL HARQ subpacket can be transmitted in the l-th DL subframe of the k-th frame. When the UL HARQ feedback indicates a negative-acknowledgement, retransmission of the UL HARQ subpacket can begin in the m-th UL subframe of the p-th frame. The subframe index m, n and frame index j, k, p can be determined by using l and i, as shown in above Table 2. It is noted that the subframe index l shall range from 0 to F−1.

UL HARQ transmission offset v $$v = \begin{cases} 0, & \text{if}((\text{ceil}(F/2) - 1) \geq T_{proc}) \\ 1, & \text{else} \end{cases}$$

UL HARQ transmission feedback w $$w = \begin{cases} 0, & \text{if}((\text{floor}(F/2) - N_{TTI}) \geq T_{proc}) \\ 1, & \text{else} \end{cases}$$

where $N_{TTI}$ is the number of subframes which a HARQ subpacket spans; i.e. 1 for the default TTI and 4 for the long TTI in FDD. The index m in Table 3 indicates the 1st subframe which a long TTI subpacket spans.

Figure 2:
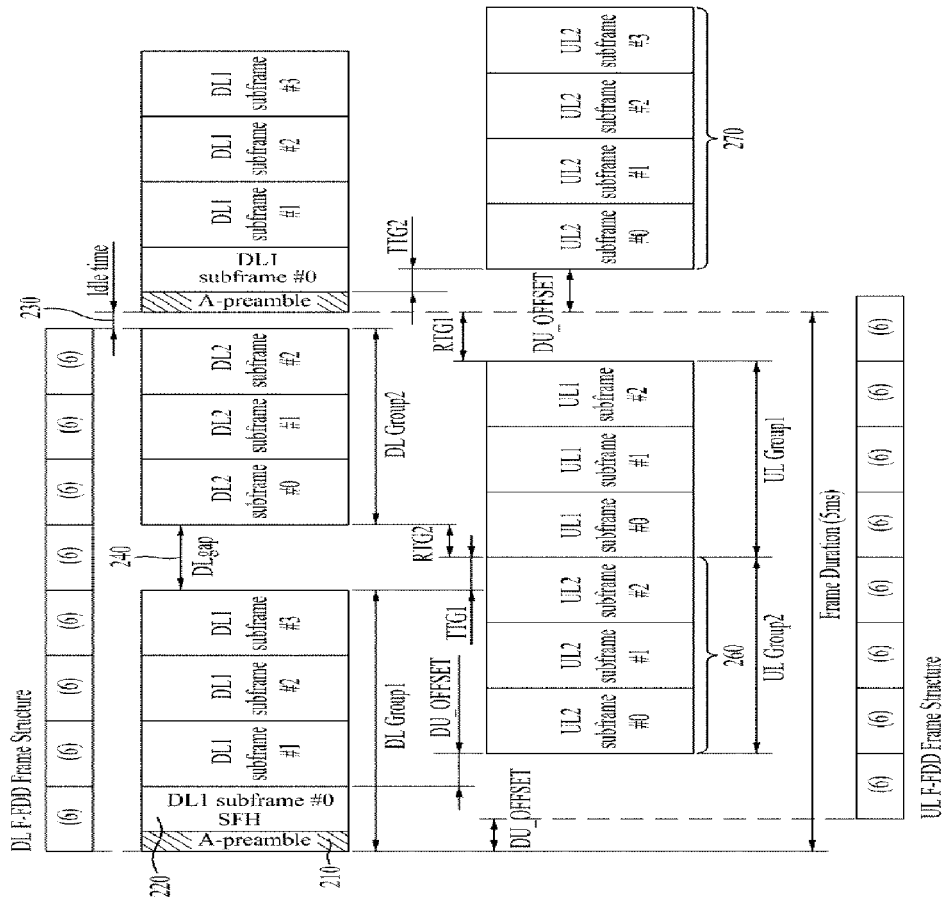
FIG. 2 shows an exemplary H-FDD based frame structure supporting for H-FDD MS in AAI system.

FIG. 2 shows an exemplary H-FDD based frame structure supporting for H-FDD MS in AAI system.

Referring to FIG. 2, IEEE 802.16m MS can be grouped into two groups as MS of existing legacy system and can performs H-FDD operation. It requires that H-FDD MS of each group have transition Gap for DL/UL switching in H-FDD frame structure. It is different from F-FDD MS. In H-FDD frame structure, specific subframe is allocated to idle time and punctured in order to maintain frame alignment with existing F-FDD frame structure. There are punctured subframe in uplink (and downlink) for H-FDD operation. H-FDD MS is operating the same HARQ timing with FDD except for punctured subframe.

In the HDD frame structure, the order of DL frame allocated for each group can be inverse with order of UL frame. If H-FDD frame structure in accordance with present invention is alignment with existing FDD frame structure, the H-FDD frame structure in accordance with present invention supports for H-FDD MS without influence to MS using the existing FDD frame structure. Since MS of each group can receive Advanced-preamble (A-preamble) 210, superframe header (SFH) 220 and, H-FDD MS is desirably not transmitted signal during UL subframe which is overlapped with DL subframe for receiving the SFH and A-Preamble. In other words, UL subframe have same timing with subframe which the SFH and A-Preamble are transmitted. H-FDD frame structure may be configured to have for DL and UL switching interval with different from existing FDD frame structure.

Accordingly, idle time 230 may be configured in DL or UL zone for DL and UL switching. The subframe allocated for DL and UL switching may be located at same location in DL and UL zone. Gap is existing for switching interval between two groups, H-FDD frame structure may be aligned with FDD frame structure. Such a H-FDD frame structure is shown in FIG. 2. Since FDD frame structure for 5 MHz, 10 MHz, 20 MHz channel bandwidths is consisted of type-1 subframe, subframe allocated for idle time 230 may be type-1 subframe. The location of subframe allocated for idle time or puncturing may be different according to length of frame allocated for two groups. Thus, frame structure shown in FIG. 2 is an exemplary, the location of subframe allocated for idle time or puncturing is not limited.

As above described, in the H-FDD frame structure, UL zone overlapped with DL zone 220 including SFH may be punctured or allocated to idle time in order to receive SFH 220. Here, first subframe index of group 2 MS is 0. The number of UL subframe of group 2 MS is 3, but the number of UL subframe 260 of group 2 MS is 4. As discussed, the number of subframe of first frame may be different from the number of subframe of second, third, fourth frames.

Figure 3:
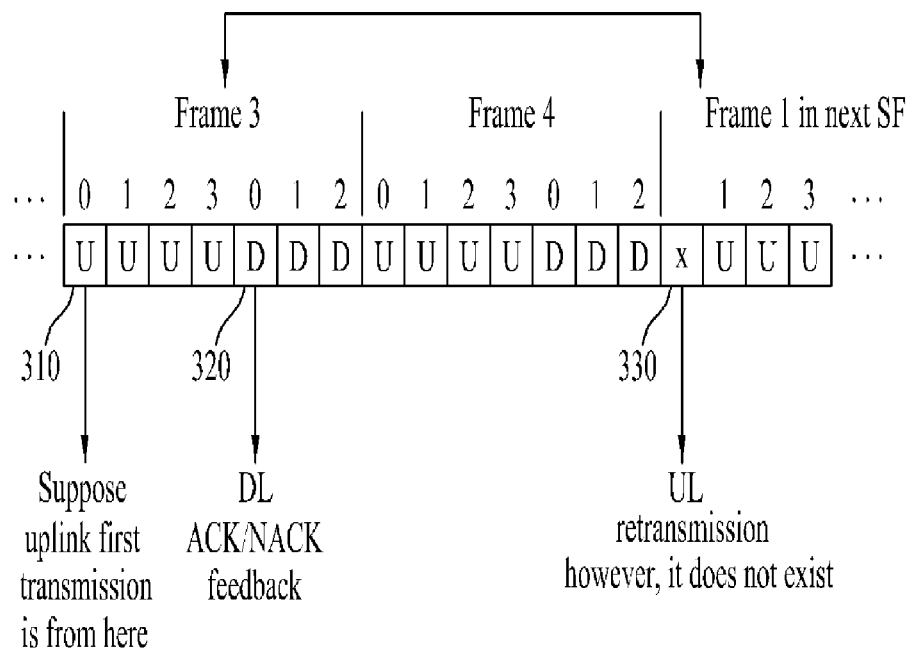
FIG. 3 shows an exemplary H-FDD based frame structure supporting for H-FDD MS in AAI system.

FIG. 3 shows an exemplary H-FDD based frame structure supporting for H-FDD MS in AAI system.

In the FIG. 3, we suppose that uplink first transmission begins from the first uplink subframe 310 of frame 3 and it assumed that Tx/Rx processing time is 3. Downlink Acknowledge/Not-Acknowledge (Ack/Nack) signal feedback can be transmitted using the first downlink subframe 320 of frame 3. The subframe indices of Frame 1 can be defined as 1, 2 and 3 for group 2 MSs. A first uplink subframe 330 of frame 1 of next superframe may be punctured or allocated to idle time in order to receive SFH or A-preamble as above discussed.

Figure 4:
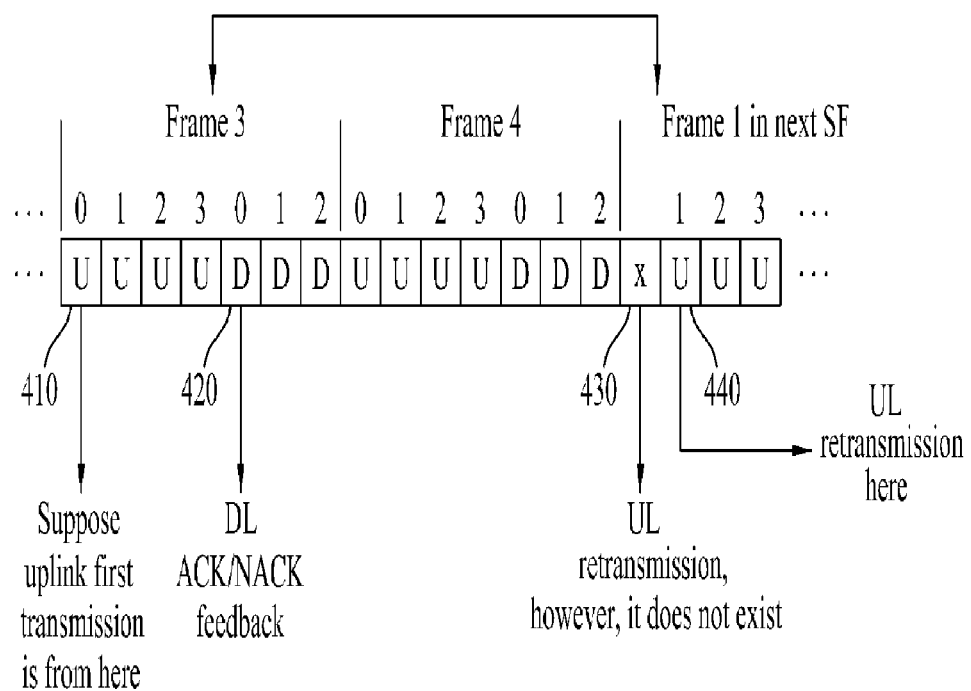
FIG. 4 shows an exemplary H-FDD based frame structure supporting for H-FDD MS in AAI system.

FIG. 4 shows an exemplary H-FDD based frame structure supporting for H-FDD MS in AAI system.

Referring to FIG. 4, if the uplink subframe timing is overlapped with SFH transmission timing, it requires that the overlapped uplink subframe is punctured. But the indices of subframes can not be changed, which means it should follow the same way as the uplink subframes in the second, third and fourth frames. Thus, the UL HARQ timing problem can be solved by shifting to the subsequent uplink subframe 440 when UL subframe 0 430 does not exist.

Figure 5:
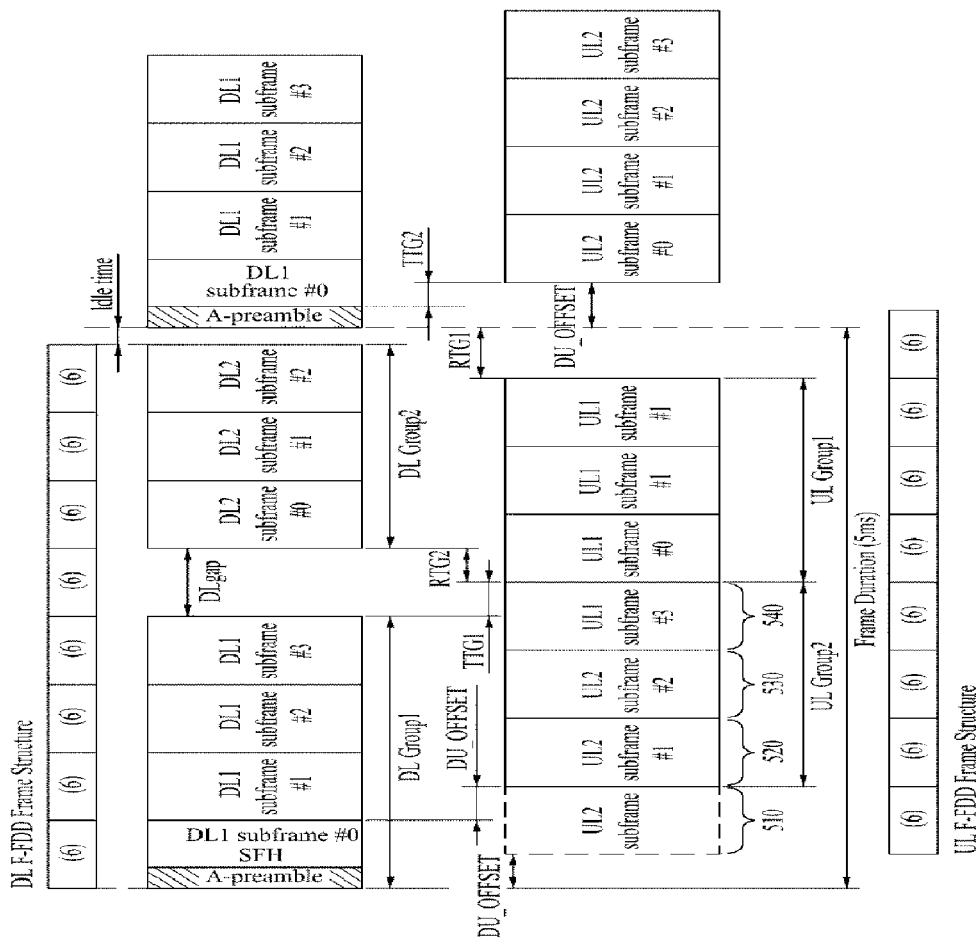
FIG. 5 shows an exemplary H-FDD based frame structure supporting for H-FDD MS in AAI system.

FIG. 5 shows an exemplary H-FDD based frame structure supporting for H-FDD MS in AAI system.

Referring to FIG. 5, in the H-FDD frame structure, first uplink subframe 510 can be punctured, but the remaining subframe index is not changed. The index of the subsequent second, third, fourth subframe 510 is 1, 2 and 3, respectively. That is, the indices of uplink subframe 520, 530, 540 group 2 MSs is changed. The proposed scheme is not limited to H-FDD based frame structure, it is fit for all of the cases in which the number of uplink subframes or downlink subframes is varied during one superframe.

Figure 6:
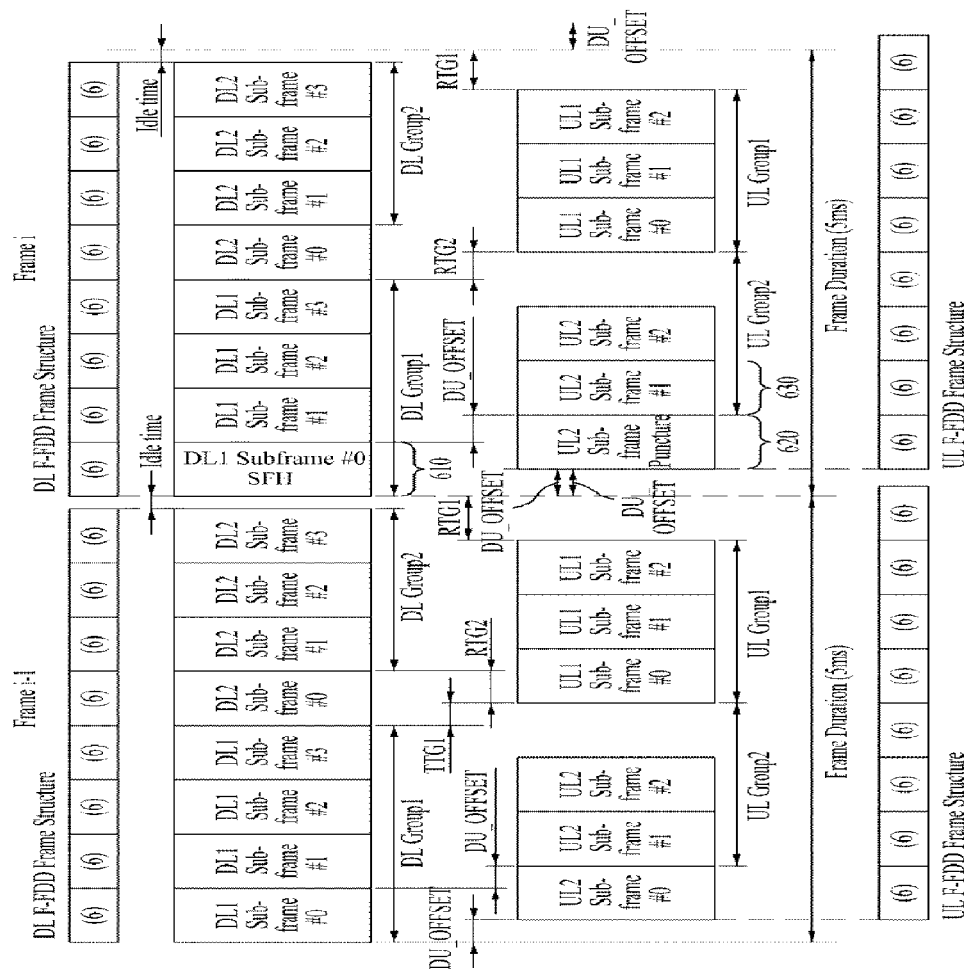
FIG. 6 shows an exemplary H-FDD based frame structure supporting for H-FDD MS in AAI system.

FIG. 6 shows an exemplary H-FDD based frame structure supporting for H-FDD MS in AAI system.

Referring to FIG. 6, this case is that the number of downlink subframe is larger than the number of uplink subframe in a frame. For group 2 MSs, the downlink HARQ problem also exists if the legacy scheme is applied in this case.

DL HARQ timing exists because UL2 subframe 0 620 is punctured for the SFH receiving in DL 1 subframe 610.

Thus, group 2 MSs can transmit the Ack/Nack signal using the UL 2 subframe 1 630. As the UL HARQ case, the ACK/NACK HARQ feedback can be done in the subsequent subframe 630 when UL 2 subframe 0 620 is punctured for the SFH receiving. Here, the uplink subframes which are not punctured should keep the same indices as frame 2, 3 and 4 as shown in FIG. 6.

The proposed scheme is not limited to H-FDD based frame structure, it is fit for all of the cases in which some of the UL subframes are punctured.

Hereinafter, Nontransparent Relay frame structure will be described.

Relay Station (RS) can be divided into two types. One is transparent RS which can receive control signal (e.g. MAP information) from BS, the other is non-transparent RS which can not receive control signal from BS. In case of MS may receive signal using transparent RS, the MS may receive data packets from transparent RS, but can directly receive control information from BS. Otherwise, in case of MS may receive signal using non-transparent RS, the MS may receive data packets and control information from non-transparent RS. Transparent RS generally may be used to improve the throughput within cell, non-transparent RS may be used to improve communication performance of the cell edge MS, non-transparent RS can enlarge cell coverage.

Figure 7:
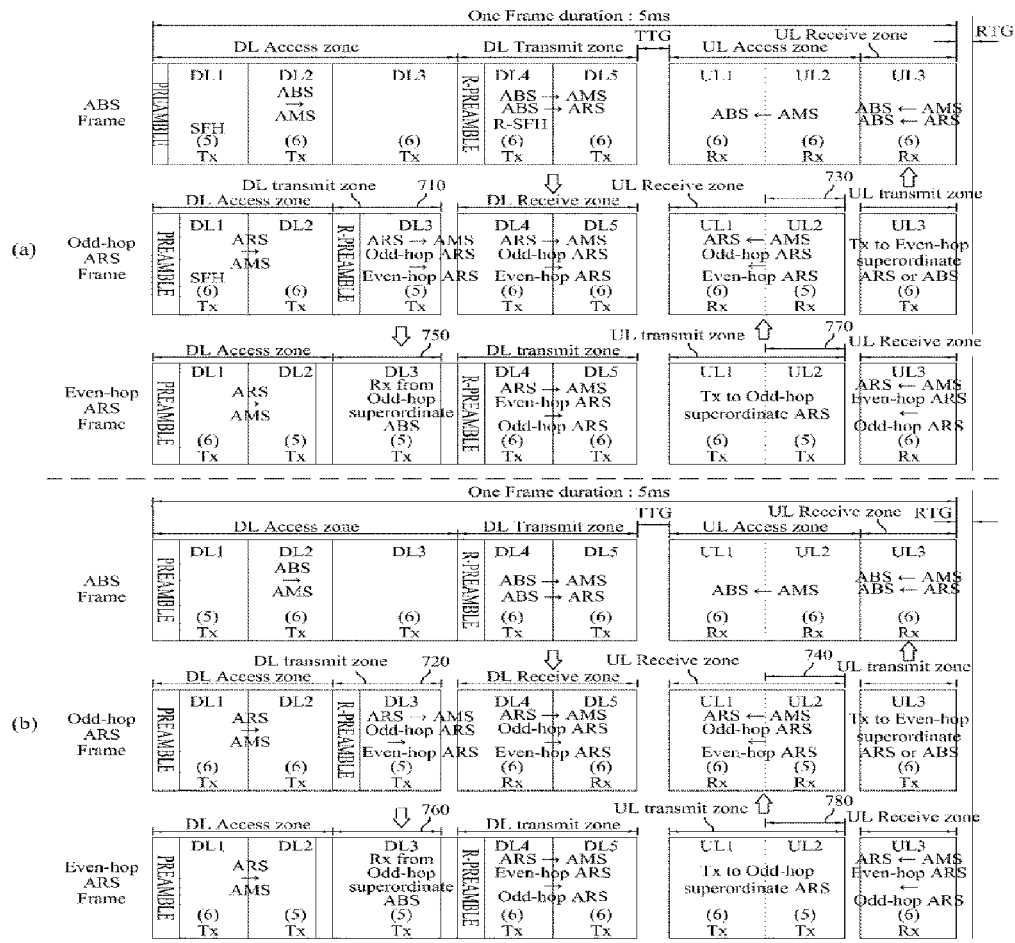
FIG. 7 shows an exemplary Nontransparent Relay frame structure for HARQ timing scheme.

FIG. 7 shows an exemplary Nontransparent Relay frame structure for HARQ timing scheme.

Referring to FIG. 7, FIG. 7(*a*) shows Nontransparent Relay frame structure (ABS, Odd-hop ARS, and Even-hop ARS) for specific one frame duration, FIG. 7(*b*) shows Nontransparent Relay frame structure (ABS, Odd-hop ARS, and Even-hop ARS) for one frame duration subsequent to the specific one frame duration. In this case, the ratio of the number of downlink subframe to uplink subframe is 5:3 in one frame. This case is about Nontransparent Relay frame structure. Because of the power deficiency problem in uplink, the introduction of uplink control channels having 5 symbols can be not easily implemented. Thus, the uplink control channels having 5 symbols UL subframes are not defined yet. Here, the uplink control channels may include Fast FeedBack CHannel (FFBCH) and HARQ FeedBack CHannel (HFBCH).

As shown in FIG. 7, specific uplink subframes can have only 5 OFDM symbols. In odd-hop ARS frame structure, DL transmit zone 710, 720 may consist of 5 OFDM symbols respectively, and UL 2 subframe 730, 740 in UL receive zone may also consist of 5 OFDM symbols respectively. In even-hop ARS frame structure, DL 3 subframe 750, 760 may consist of 5 OFDM symbols respectively, and UL 2 subframe 770, 780 in UL transmit zone may also consist of 5 OFDM symbols respectively.

There is no control channel HARQ FeedBack Channel in UL 2 subframe 730, 740 within UL receive zone in odd-hop ARS frame structure and UL 2 subframe 770, 780 within UL transmit zone in even-hop ARS frame structure. Thus, these subframes 730, 740, 770 and 780 can be punctured.

The present invention will propose redefinition about parameters in the HARQ timing. It is required to modify existing parameters in order to apply the existing equations which determine the DL or UL HARQ timing.

For DL HARQ timing, U can be redefined as U_DL, U_DL means the number of UL subframes with control channel HFBCH. For example, U_DL=5 based on the relay frame structure shown in FIG. 7. For UL HARQ timing, U can be redefined as U_UL, U_UL means the number of available UL subframes. For example, U_UL=6 based on the relay frame structure in shown in FIG. 7.

The proposed modification is not limited to above relay frame structure, it is fit for all of the cases in which some of the UL subframes without control channels.

It should be understood that in alternative implementations, certain logic operations may be performed in a different order, modified or removed and still implement embodiments of the present invention. Moreover, operations may be added to the above described logic and still conform to assorted implementations of the invention.

Furthermore, the described embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor.

The code in which preferred embodiments are implemented may further be accessible through a transmission media or from a file server over a network. In such cases, the article of manufacture in which the code is implemented may include a transmission media, such as a network transmission line, wireless transmission media, signals propagating through space, radio waves, infrared signals, etc. Of course, those skilled in the art will recognize that many modifications may be made to this configuration, and that the article of manufacture may comprise any information bearing medium known in the art.

The logic implementation shown in the figures describe specific operations as occurring in a particular order. In alternative implementations, certain logic operations may be performed in a different order, modified or removed and still implement certain embodiments of the present invention. Moreover, operations may be added to the above described logic and still conform to the described implementations.

The foregoing embodiments and advantages are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

MODE FOR THE INVENTION

Various embodiments have been described in the best mode for carrying out the invention.

INDUSTRIAL APPLICABILITY

The method for retransmitting data in wireless communication system according to the present invention is applicable industrially.

The invention claimed is:

1. A method for retransmitting data in wireless communication system of H-FDD (Half-Frequency Division Duplex), the method performed by a mobile station (MS) and comprising:

receiving, from a base station (BS), a NACK (Not-ACKnowledge) signal for an uplink data transmission;
determining a first uplink subframe, which has a subframe index 0 in an uplink frequency band, for retransmitting the uplink data based on the NACK signal;
receiving, from the BS, a superframe header (SFH) in a first downlink subframe of a first frame of a first superframe in a downlink frequency band, wherein the first downlink subframe is overlapped in time with the first uplink subframe and the first uplink subframe for retransmitting the uplink data is punctured to receive the SFH; and
retransmitting, to the BS, the uplink data in a second uplink subframe which has a subframe index 1 in the uplink frequency band, instead of the first uplink subframe which has the subframe index 0,
wherein indices of uplink subframes are increased by 1, in ascending order from 0, and the second uplink subframe which has the subframe index 1 is a subsequent subframe of the first subframe which has the subframe index 0, and
wherein indices of uplink subframes other than the first uplink subframe are maintained regardless of puncturing of the first uplink subframe.

2. The method according to claim 1, a group index of the MS is 2.

3. A mobile station (MS) apparatus for retransmitting data in wireless communication system of H-FDD (Half-Frequency Division Duplex), the MS apparatus comprising:
a receiving module;
a transmit module; and
a processor that:
receives, from a base station (BS), a NACK (Not-ACKnowledge) signal for an uplink data transmission through the receiving module,
determines a first uplink subframe, which has a subframe index 0 in an uplink frequency band, for retransmitting the uplink data based on the NACK signal,
receives, from the BS, a superframe header (SFH) in a first downlink subframe of a first frame of a first superframe in a downlink frequency band, wherein the first downlink subframe is overlapped in time with the first uplink subframe and the first uplink subframe for retransmitting the uplink data is punctured to receive the SFH through the receiving module, and
retransmits, to the BS, the uplink data in a second uplink subframe which has a subframe index 1 in the uplink frequency band, instead of the first uplink subframe which has the subframe index 0, through the transmit module,
wherein indices of uplink subframes are increased by 1, in ascending order from 0, and the second uplink subframe which has the subframe index 1 is a subsequent subframe of the first subframe which has the subframe index 0, and
wherein indices of uplink subframes other than the first uplink subframe are maintained regardless of puncturing of the first uplink subframe.

* * * * *